May 11, 1937.  H. A. MILLER  2,080,291
CLUTCH
Filed April 6, 1935
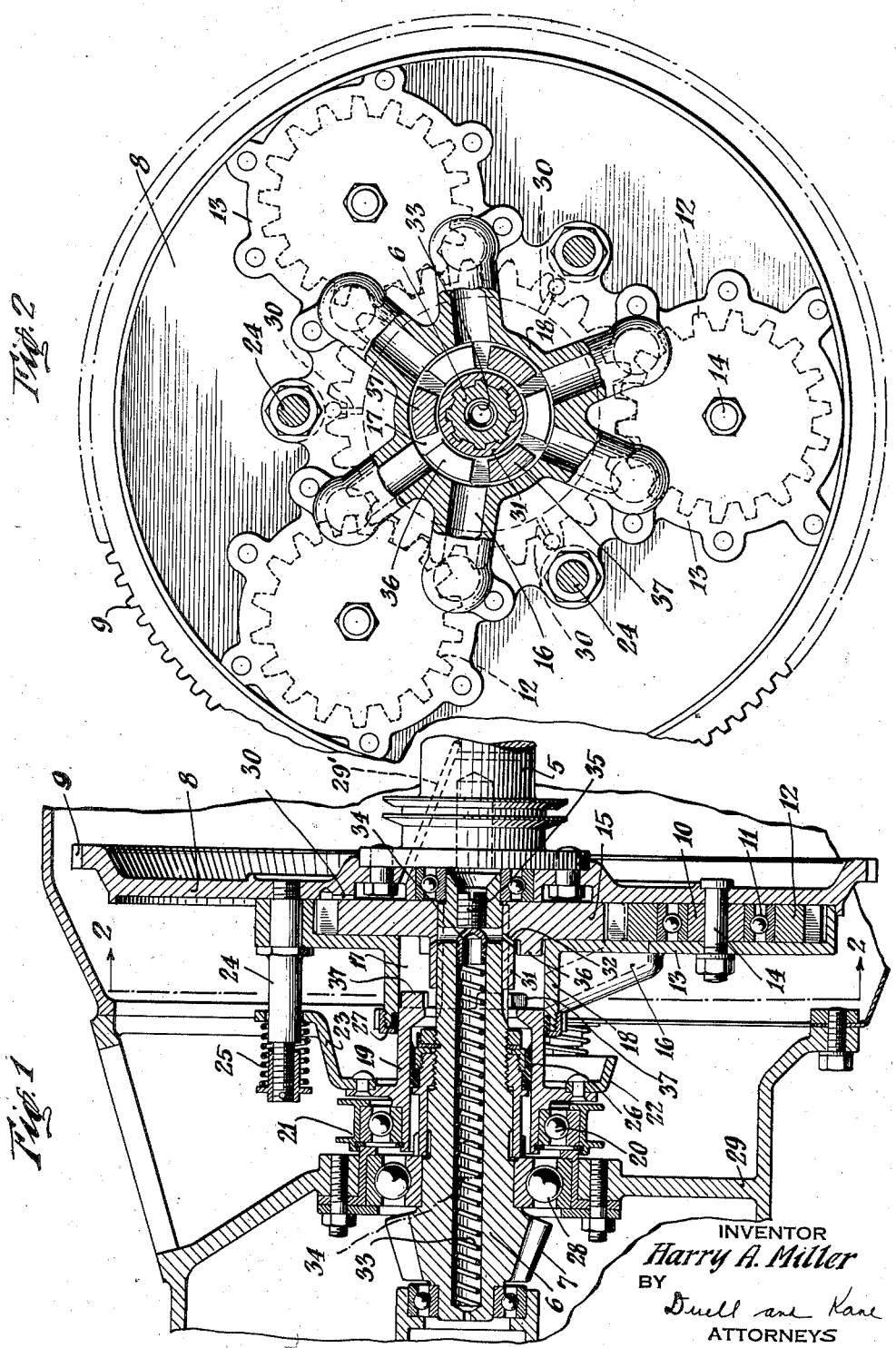
INVENTOR
Harry A. Miller
BY
Duell and Kane
ATTORNEYS Patented May 11, 1937

2,080,291

UNITED STATES PATENT OFFICE 2,080,291

CLUTCH

Harry A. Miller, New York, N. Y., assignor to H. A. Miller Engineering Corporation, New York, N. Y., a corporation of New York Application April 6, 1935, Serial No. 14,968

5 Claims. (Cl. 192—57)

This invention relates to a structurally and functionally improved clutch and in its more specific aspects aims to provide a hydraulic unit of this character which may be employed in numerous different associations, but is primarily intended for use in connection with automotive and similar drives.

It is an object of the invention to furnish a unit of this character in which slippage of the parts may be substantially eliminated and in which, moreover, the parts will be cushioned against shocks and strains.

A further object of the invention is that of providing an apparatus of this nature which may be readily controlled and in which the fluid may be properly accommodated under all conditions.

An additional object is that of furnishing a clutch which will embody relatively few parts, each individually simple and rugged in construction, and which parts may be readily assembled to furnish a unitary apparatus operating over long periods of time with freedom from difficulties.

With these and other objects in mind, reference is had to the attached sheet of drawings illustrating one practical embodiment of the invention and in which:—

Fig. 1 is a fragmentary sectional side elevation of a clutch, and

Fig. 2 is a transverse sectional view taken along the line 2—2 and in the direction of the arrows in Fig. 1.

In these views the numeral 5 indicates the driving shaft and 6 a driven shaft. In the embodiment under consideration the shaft 5 is the crank shaft of a motor and the shaft 6 has associated with it a pinion 7. This pinion may serve to drive one or more gears (not shown) and which, for example, are connected to the axle of a vehicle. Obviously the driving and driven members might involve a radically different construction, although it is preferred that the present structure be embodied.

Secured to the shaft 5 is a plate or disc 8 which may have teeth 9 formed in its periphery. Mounted upon the rear face of this disc is a series of hubs 10 which, by means of ball bearings 11, rotatably support gears 12. These gears are enclosed within a housing 13 having extended portions or pockets corresponding in number to and of an area adequate to enclose the gears 12 and the parts associated therewith. Mounting for the hubs 10 may be provided by bolts 14 which also serve to maintain the housing 13 in applied position. Splined to the shaft 6 is a sun gear 15 the teeth of which mesh with the teeth of gears 12, which latter thus function as planet gears.

In advance and to the rear of the zones of meshing of the planet gears 12 with the teeth of gear 15 the housing 13 is formed with passages 16. These passages are continued inwardly from the points indicated and communicate with a central chamber or passage 17. This passage or space may be furnished by extending the housing 13 inwardly in a direction parallel to and spaced from the shaft 6. This housing portion has been indicated at 18. Projectable into this space is a valve including a collar portion 19, the rear edge of which supports, by means of anti-friction balls 20, an annular guideway or grooved member 21 which may be suitably engaged by a shifting member (not shown) for the purpose of projecting and retracting the inner end of the valve body within the space 17. The collar member 19 also mounts a plate 22 which may be formed with, for example, three extensions 23, each having an opening so as to slidably accommodate the body of a bolt 24. One end of each of these bolts is coupled to the housing 13 and the plate 8, while the opposite ends thereof mount springs 25 which constantly urge the plate 22 inwardly so that the inner end of the valve or collar member 19 is also constantly urged to a position at which it will substantially occupy the entire area of the passage 17.

The driven shaft 6 may mount a suitable packing structure 26 which co-acts with the adjacent surfaces of the collar member 19 to prevent oil or other liquid escaping along these surfaces. A similarly suitable packing structure 27 may be associated with the extension 18 of the housing 13 and co-act with the exterior surface of the collar member 19 for the purpose of preventing fluid escape. As shown, the entire shaft 6 is preferably supported by anti-friction bearings 28 which are in turn supported, for example, by an inwardly extending wall portion 29 of the housing which encloses the entire unit.

From the foregoing it is obvious that with the parts in the position shown in Fig. 1 and with the shaft 5 turning, the plate 8 will be turned to cause orbital movement of the gears 12. The latter will rotate freely upon their bearings 11 and there will be substantially no tendency to turn the gear 15 in view of the fact that any liquid within the housing 13 will simply flow through the outer end of one of the passages 16 and the advance of the point of meshing of the teeth of the gears 12 and 15, such fluid moving into the space 17 and flowing thence outwardly through one of the passages 16 and being thus circulated incident to movement of the parts.

Now, if the member 21 is released so that these springs 25 may shift the collar 19 inwardly, it is apparent that the inner ends of the passage 16 will be increasingly sealed. As such sealing progresses, the fluid may escape from in advance of the zones of mesh of the gears only in decreasing amounts and finally this fluid flow will be entirely cut off. During this operation the planetary gears 12 which have heretofore rotated freely around the sun gear 15 will increasingly tend to resist this movement until a point has finally been reached when the gear 15, and consequently the shaft 6, begins to turn. With the valve 19 moved to its fully closed condition, there should be substantially no movement on the part of the planet gears 12 with respect to the sun gear 15. Therefore the shafts 5 and 6 should move in unison.

Fluid is supplied to the entire unit preferably by tapping the shaft 5 to provide an oil passage 29' extending from the zone of the rear main bearing (not shown) to the space between the plate 8 and the gear 15. At this point passages 30 exist which allow distribution of the oil to those portions of the housing 13 which accommodate the gear 15 and at a point between the gears 12. Obviously, as the collar member 19 is projected, the oil within the space 17 will be displaced. In order to accommodate and allow for this displaced oil, the extended portion 31 of the gear 15 may be bored as at 32 so that an escape of fluid from this space is permissible. The shaft 6 is bored and vented and within this bore a relatively soft spring 33 is positioned. Associated with the outer end of this spring is a cap in the nature of a piston 34 and which normally rides against a stop block or plug 35 mounted within the end of the shaft 6. Consequently, when the fluid flows through the passage 32 incident to the projection of the collar 19, it will retract the piston or cap 34 until the latter finally assumes the position indicated in dotted lines in Fig. 1, at which point substantially all of the oil within the passage 17 will have been displaced.

As afore indicated, under these circumstances the parts should remain relatively fixed with relation to each other. However, under certain conditions—and especially where the unit is subjected to a severe overload—slippage of the parts may occur by the oil squeezing past the zones of mesh of the planet gear 12 and the sun gear 15. With a view to avoiding all difficulties in this connection and insuring a proper positive drive, the gear 15 may be formed adjacent its extended portion 31 with a series of dogs 36 between which there is space adequate to accommodate a corresponding number of dogs 37 integral with, or otherwise coupled to the inner end of the collar 19. With the parts thus projected, it is quite obvious that no real slippage can occur. It is likewise obvious, however, that the hydraulic clutch has functioned to give an infinite ratio of drive as the valve provided by the collar 19 has closed, to an increasing extent, the inner ends of the passages 16. Finally a fixed drive is achieved between the parts insofar as this is possible by a hydraulic coupling. At this point, the inner ends of the passages are completely sealed and it is only thereafter that the final stage of a mechanical interlock between the dogs 36 and 37 occurs.

Thus among others the several objects of the invention as specifically aforenoted are achieved. It will be appreciated that numerous changes in construction and rearrangements of the parts might be resorted to without departing from the spirit of the invention as defined by the claims.

Having thus described the invention, what is claimed is:

1. A clutch including, in combination, a driving shaft, a driven shaft, gears rotatably secured to said driving shaft, a gear secured to said driven shaft, encasing members for said gears and formed with passageways to conduct fluid from one to the other side of the gears associated with said driving shaft, said passageways having their inner ends terminating adjacent and spaced from said driven shaft, a valve mounted for slidable movement within the space between the inner ends of said passageways and driven shaft for controlling the flow of fluid through said passageways, said driven shaft being formed with a bore to receive fluid displaced by said valve as the latter is projected.

2. A clutch including, in combination, a driving shaft, a driven shaft, gears rotatably secured to said driving shaft, a gear secured to said driven shaft, encasing members for said gears and formed with passageways to conduct fluid from one to the other side of the gears associated with said driving shaft, said passageways having their inner ends terminating adjacent to and spaced from said driven shaft, a valve mounted for slidable movement within the space between the inner ends of said passageways and driven shaft for controlling the flow of fluid through said passageways, said driven shaft being formed with a bore to receive fluid displaced by said valve as the latter is projected, and a spring pressed plunger within said bore and adapted to be retracted as said bore receives said displaced fluid.

3. A clutch including, in combination, a driving shaft, a driven shaft, gears rotatably secured to said driving shaft, a gear secured to said driven shaft, encasing members for said gears and formed with passageways to conduct fluid from one to the other side of the gears associated with said driving shaft, said passageways having their inner ends terminating adjacent to and spaced from said driven shaft, a valve mounted for slidable movement within the space between the inner ends of said passageways and driven shaft for controlling the flow of fluid through said passageways, said valve being secured against rotation with respect to said driving shaft, means for projecting and retracting said valve, and clutch portions formed on the gear associated with said driven shaft and on the inner end of said valve, said portions being cooperative to assure a fixed connection from said driving to said driven shaft upon said valve being shifted through passageway obstructing position and adjacent said driven gear.

4. A clutch including, in combination, a driving shaft, a driven shaft, gears rotatably secured to said driving shaft, a gear secured to said driven shaft, encasing members for said gears and formed with passageways to conduct fluid from one to the other side of the gears associated with said driving shaft, said passageways having their inner ends terminating adjacent to and spaced from said driven shaft, a valve mounted for slidable movement within the space between the inner ends of said passageways and driven shaft for controlling the flow of fluid through said passageways, bolts connected to said driving shaft and connecting said encasing members therewith, a plate secured to said valve and formed with openings through which said bolts extend to prevent rotation of said valve with respect to said driving shaft, means for projecting and retracting said valve, and cooperative clutch portions formed on the gear associated with said driven shaft and on the inner end of said valve.

5. A clutch including, in combination, a driving shaft, a driven shaft, gears rotatably secured to said driving shaft, a gear secured to said driven shaft, encasing members for said gears and formed with passageways to conduct fluid from one to the other side of the gears associated with said driving shaft, said passageways having their inner ends terminating adjacent to and spacd from said driven shaft, a valve mounted for slidable movement within the space between the inner ends of said passageways and driven shaft for controlling the flow of fluid through said passageways, bolts connected to said driving shaft and connecting said encasing members therewith, a plate secured to said valve and formed with openings through which said bolts extend to prevent rotation of said valve with respect to said driving shaft, springs associated with said bolts and positioned beyond said plate to act thereon to normally project said valve, means whereby said valve may be retracted, and clutch portions formed on the gear associated with said driven shaft and on the inner end of said valve to cooperate when said valve is projected to prevent movement of said driven gear and shaft with respect to said driving shaft.

HARRY A. MILLER.